(12) United States Patent
Kim (10) Patent No.: US 10,118,565 B2
(45) Date of Patent: Nov. 6, 2018

(54) APPARATUS FOR HOLDING PORTABLE DEVICE

(71) Applicant: Sehhan Kim, Seoul (KR)

(72) Inventor: Sehhan Kim, Seoul (KR)

(*) Notice: Subject to any disclaimer, the term of this patent is extended or adjusted under 35 U.S.C. 154(b) by 0 days.

(21) Appl. No.: 15/969,207

(22) Filed: May 2, 2018

(65) Prior Publication Data

US 2018/0251078 A1 Sep. 6, 2018

Related U.S. Application Data

(63) Continuation-in-part of application No. 15/420,328, filed on Jan. 31, 2017, now Pat. No. 9,975,497, which (Continued)

(30) Foreign Application Priority Data

May 8, 2015 (KR) .................. 10-2015-0064766
Oct. 16, 2017 (KR) .................. 10-2017-0134021

(51) Int. Cl.
*B60R 11/00* (2006.01)
*B60R 11/02* (2006.01)
*F16B 2/12* (2006.01)

(52) U.S. Cl.
CPC .......... *B60R 11/00* (2013.01); *B60R 11/0241* (2013.01); *B60R 11/0252* (2013.01);
(Continued)

(58) Field of Classification Search
CPC ..... B60R 11/00; B60R 11/02; B60R 11/0241; B60R 2011/0071; B60R 2011/0064;
(Continued)

(56) References Cited

U.S. PATENT DOCUMENTS

| 5,179,590 A * | 1/1993 | Wang .................. B60R 11/0241 224/482 |
| 5,305,381 A * | 4/1994 | Wang .................. B60R 11/0241 379/426 |

(Continued)

FOREIGN PATENT DOCUMENTS

KR 10-1326687 11/2013

OTHER PUBLICATIONS

Exshow Universal 360 Rotate Car Air Vent Phone Cradle Mount, date first reviewed Oct. 1, 2016, https://www.amazon.com/dp/B01KYVSOSE/ref=sxbs_sxwds-stppvp_1?of_rd_m=ATVPDKIKX0DER&pf_rd_p=4775113870196211269&pd_rd_wg=AOFo3&pf_rd_r=RYJVTYEG0D941XNHP7E2&pf_rd_s=desktop-sx-bottom-slot&pf_rd_t=301&pd_rd_i=B01KYVSOSE&pd_rd.

*Primary Examiner* — Brian D Nash
(74) *Attorney, Agent, or Firm* — Sand & Sebolt (57) ABSTRACT

Disclosed is a portable device holding apparatus including a body portion including a body on which a portable device is disposed and which includes an open bottom surface and a fixing pad which supports one side of the portable device, a mobile portion including a mobile pad which is linearly movable between a first position which supports the other side of the portable device and a second position spaced at a certain distance apart from the other end of the portable device, an elastic plate which fixes a movement of the mobile pad to the second position, a button which is pushed by the portable device during a process in which the portable device is disposed on the body portion, and releases fixing of the movement of the mobile pad of the elastic plate, a tongs portion coupled at a bottom of the body portion.

8 Claims, 7 Drawing Sheets

Related U.S. Application Data is a continuation-in-part of application No. 15/148,093, filed on May 6, 2016, now Pat. No. 9,586,530.

(52) U.S. Cl.
CPC ............ B60R 11/0258 (2013.01); F16B 2/12 (2013.01); *B60R 2011/0071* (2013.01); *B60R 2011/0085* (2013.01)

(58) Field of Classification Search
CPC ....... B60R 2011/0075; B60R 2011/008; B60R 2011/0084
USPC .......................................... 224/570, 567, 929
See application file for complete search history.

(56) References Cited

U.S. PATENT DOCUMENTS

| | | | |
|---|---|---|---|
| 5,396,556 A | 3/1995 | Chen | |
| 5,457,745 A * | 10/1995 | Wang | ................ B60R 11/0241 379/426 |
| 5,471,530 A * | 11/1995 | Chen | ................ B60R 11/0241 379/426 |
| 5,555,302 A * | 9/1996 | Wang | ................ B60R 11/0241 379/426 |
| 5,593,124 A | 1/1997 | Wang | |
| 5,615,258 A * | 3/1997 | Ho | ..................... B60R 11/0241 379/446 |
| 5,836,563 A | 11/1998 | Hsin-Yung | |
| 5,860,824 A | 1/1999 | Fan | |
| 5,903,645 A | 5/1999 | Tsay | |
| 5,979,724 A | 11/1999 | Loewenthal, Jr. et al. | |
| 6,229,891 B1 * | 5/2001 | Chen | ................ B60R 11/0241 379/446 |
| 6,320,962 B1 | 11/2001 | Eisenbraun | |
| 6,360,083 B1 | 3/2002 | Fan | |
| 6,366,672 B1 | 4/2002 | Tsay | |
| 7,080,812 B2 * | 7/2006 | Wadsworth | ............. B60R 11/02 248/316.1 |
| 7,418,097 B2 | 8/2008 | Chang | |
| 8,191,851 B2 | 6/2012 | Crown | |
| D684,980 S | 6/2013 | Chun | |
| D690,707 S | 10/2013 | Minn et al. | |
| D707,672 S * | 6/2014 | Lai | ................................ D14/253 |
| D718,298 S | 11/2014 | Aspinall et al. | |
| D720,759 S | 1/2015 | Deng et al. | |
| D727,333 S | 4/2015 | Shih et al. | |
| 9,080,714 B2 | 7/2015 | Minn et al. | |
| D739,410 S | 9/2015 | Chun | |
| D744,473 S | 12/2015 | Tsai et al. | |
| D750,633 S | 3/2016 | Minn et al. | |
| D757,705 S | 5/2016 | Esses | |
| D765,651 S | 9/2016 | Liu et al. | |
| D767,556 S | 9/2016 | Lee | |
| D768,125 S | 10/2016 | Kim | |
| D769,860 S | 10/2016 | Xiao | |
| D780,168 S | 2/2017 | Du | |
| D782,462 S | 3/2017 | Huang | |
| D783,592 S | 4/2017 | Ju | |
| D783,593 S | 4/2017 | Chen | |
| D784,977 S | 4/2017 | Ormsbee et al. | |
| D789,920 S | 6/2017 | Zhang | |
| D792,416 S | 7/2017 | Tsai | |
| D796,421 S | 9/2017 | Huang | |
| D798,872 S | 10/2017 | Gonen | |
| D799,466 S | 10/2017 | Sukphist et al. | |
| D803,208 S | 11/2017 | Cai | |
| D805,021 S | 12/2017 | Cunningham | |
| D807,371 S | 1/2018 | Bertelle | |
| D815,104 S | 4/2018 | Bertelle | |
| D816,076 S | 4/2018 | Ahn | |
| 9,956,923 B2 | 5/2018 | Minn et al. | |
| 2004/0179678 A1 | 9/2004 | Hsu Li | |
| 2005/0236536 A1 | 10/2005 | Fan | |
| 2006/0061993 A1 | 3/2006 | Fan | |
| 2006/0278788 A1 | 12/2006 | Fan | |
| 2007/0262223 A1 | 11/2007 | Wang et al. | |
| 2012/0199621 A1 | 8/2012 | Yoon | |
| 2012/0267061 A1 | 10/2012 | Fan | |
| 2012/0267406 A1 | 10/2012 | Fan | |
| 2014/0103087 A1 | 4/2014 | Fan | |
| 2014/0138418 A1 | 5/2014 | Dunn | |
| 2014/0138419 A1 | 5/2014 | Minn | |
| 2015/0072555 A1 | 3/2015 | Riddiford et al. | |
| 2015/0274088 A1 | 10/2015 | Minn et al. | |

\* cited by examiner

APPARATUS FOR HOLDING PORTABLE DEVICE

CROSS-REFERENCE TO RELATED APPLICATION

This application is a Continuation-in-Part of U.S. patent application Ser. No. 15/420,328 filed Jan. 31, 2017, which is a Continuation-in-Part of U.S. patent application Ser. No. 15/148,093, filed May 6, 2016, now U.S. Pat. No. 9,586,530, which claims the benefit of Korean Patent Application 10-2015-0064766 filed May 8, 2015, now Korean Patent No. 10-1566660; the disclosures of these applications are incorporated herein in their entirety.

This application also claims priority to Korean Patent Application No. 10-2017-0134021, filed on Oct. 16, 2017.

BACKGROUND

1. Field of the Invention

The present invention relates to a portable device holding apparatus for holding a portable device in a vehicle.

2. Discussion of Related Art

Generally, portable devices such as a navigation device, a portable multimedia player (PMP), personal digital assistants (PDA), a digital multimedia broadcasting (DMB) player, an electronic dictionary, a cellular phone, and the like have been miniaturized to be used while being carried and held in a vehicle. The portable device is used while being held by a portable device holding apparatus in a vehicle. The portable device holding apparatus pushes an upward and downward movement holding member and holds the portable device while the portable device is located in a holder. Since it is necessary to use both hands of a driver to hold the portable device in the portable device holding apparatus, it is not easy to hold the portable device while driving. Also, since plurality of operations are necessary in a process of holding or taking out the portable device, the process is complicated.

Meanwhile, latest portable devices may provide a screen in both a transverse direction and a longitudinal direction depending on tilting of a lateral length of the portable device. However, there is an inconvenience in which it is impossible to set the screen of the portable device fixed to the portable device holding apparatus to be in a direction desired by a user.

SUMMARY OF THE INVENTION

It is an aspect of the present invention to provide a portable device holding apparatus capable of being stably held in a vehicle and conveniently holding a portable device by using only one hand.

It is another aspect of the present invention to provide a portable device holding apparatus capable of rotating a portable device which is held.

According to one aspect of the present invention, a portable device holding apparatus includes a body portion including a body on which a portable device is disposed and which includes an open bottom surface and a fixing pad which supports one side of the portable device, a mobile portion including a mobile pad which is linearly movable between a first position which supports the other side of the portable device and a second position spaced at a certain distance apart from the other end of the portable device, an elastic plate which fixes a movement of the mobile pad to the second position, a button which is pushed by the portable device during a process in which the portable device is disposed on the body portion, and releases fixing of the movement of the mobile pad of the elastic plate, a tongs portion coupled at a bottom of the body portion, and a rotating portion fixedly coupled to a top of the tongs portion and rotatably coupled to the bottom of the body portion. Here, the body portion includes a rotation coupling portion which protrudes downward from a bottom surface and is formed in a circular shape, a rotation insertion portion which is formed to be depressed upward from the rotation coupling portion and into and to which the rotating portion is inserted and coupled, an uneven portion which includes consecutive bumps on an inner circumferential surface of the rotation insertion portion, and a lower cover which includes a rotation shaft formed in a cylinder at a center of the rotation insertion portion. Also, the rotating portion includes a rotating plate which is a circular plate and includes a vertically penetrated through hole formed at a center thereof, a rotating body which includes a plate spring support protruding from a top surface of the rotating plate, and a plate spring fixedly coupled to the plate spring support.

The mobile portion may include a mobile base coupled to the mobile pad, a mobile shaft which includes one open end inserted into and coupled to the mobile base and the other end including a holding protrusion insertable into the elastic plate, and a spring into which the mobile shaft is inserted and which is elastically compressed by the mobile shaft linearly moving from the first position to the second position.

The tongs portion may include a tongs clip which includes a tongs body in a plate shape and tongs legs extended downward from both sides of the tongs body, and a coupling clip coupled to the tongs clip and coupled to the rotating body by a fixing bolt. Also, the rotating plate may include a fitted portion inserted into a bottom surface thereof and where the coupling clip is mounted on and coupled to.

The rotation shaft may include a first shaft with a bottom end fixed to the rotation insertion portion and a top surface on which the rotating plate is mounted, a second shaft formed above the first shaft to have a smaller circumference than that of the first shaft and to be inserted into the through hole of the rotating plate, and a first holding portion formed on an outer circumferential surface of the first shaft. Also, the plate spring support may include a second holding portion which comes into contact with the first holding portion due to rotation of the rotating body coupled to the rotation insertion portion, and is formed on an inner circumferential surface of the plate spring support.

The plate spring may include a protrusion which protrudes outward from a center of a curved surface thereof and is held by the uneven portion to prevent the rotating plate from arbitrarily rotating and a fitting portion bent toward an inside of the curved surface and coupled to both ends of the plate spring.

The portable device holding apparatus may further include a supporter coupled to the rotation coupling portion by the tongs portion coupled to the body portion. Also, the rotation coupling portion may further include a rotation mounting portion formed to be a step on an outer circumferential surface thereof and on which the supporter is mounted.

The supporter may include a supporting body having a certain thickness, a rotation hole formed in a circular shape at a center of the supporting body, and a rotating protrusion which protrudes from an inner circumferential surface of the rotation hole and is mounted on the rotation mounting portion.

The supporter may include a plurality of contact supports formed by extending the supporting body outward and bending extended ends of the supporting body upward.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, an exemplary embodiment of the present invention will be described in detail with reference to the attached drawings to clarify the technical concept of the present invention. In the description of the present invention, certain detailed explanations of well-known functions or components of the related art will be omitted when it is deemed that they may unnecessarily obscure the essence of the present invention. Throughout the drawings, components having the substantially same function will be referred to as the same reference numerals and symbols even when shown in different drawings. For convenience of description, an apparatus and a method will be described together as necessary.

Figure 1:
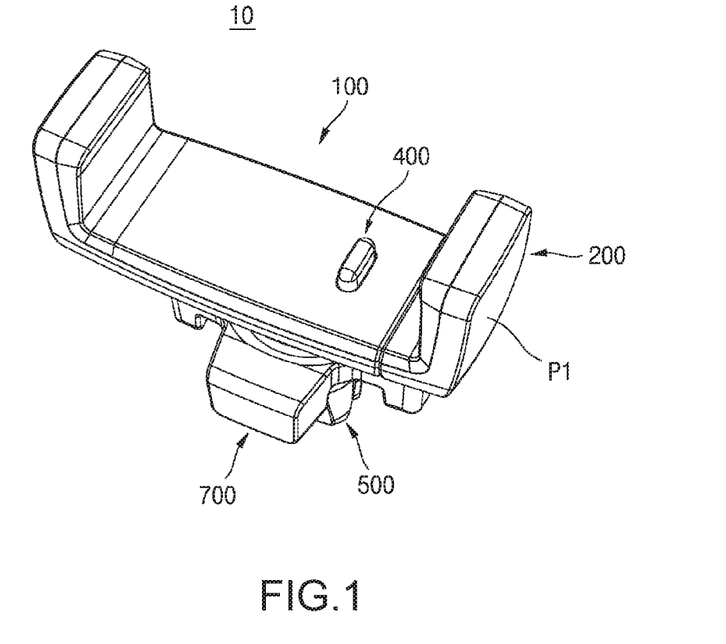
FIG. 1 is a perspective view of a portable device holding apparatus according to one embodiment of the present invention.

FIG. 1 is a perspective view of a portable device holding apparatus according to one embodiment of the present invention.

Figure 2:
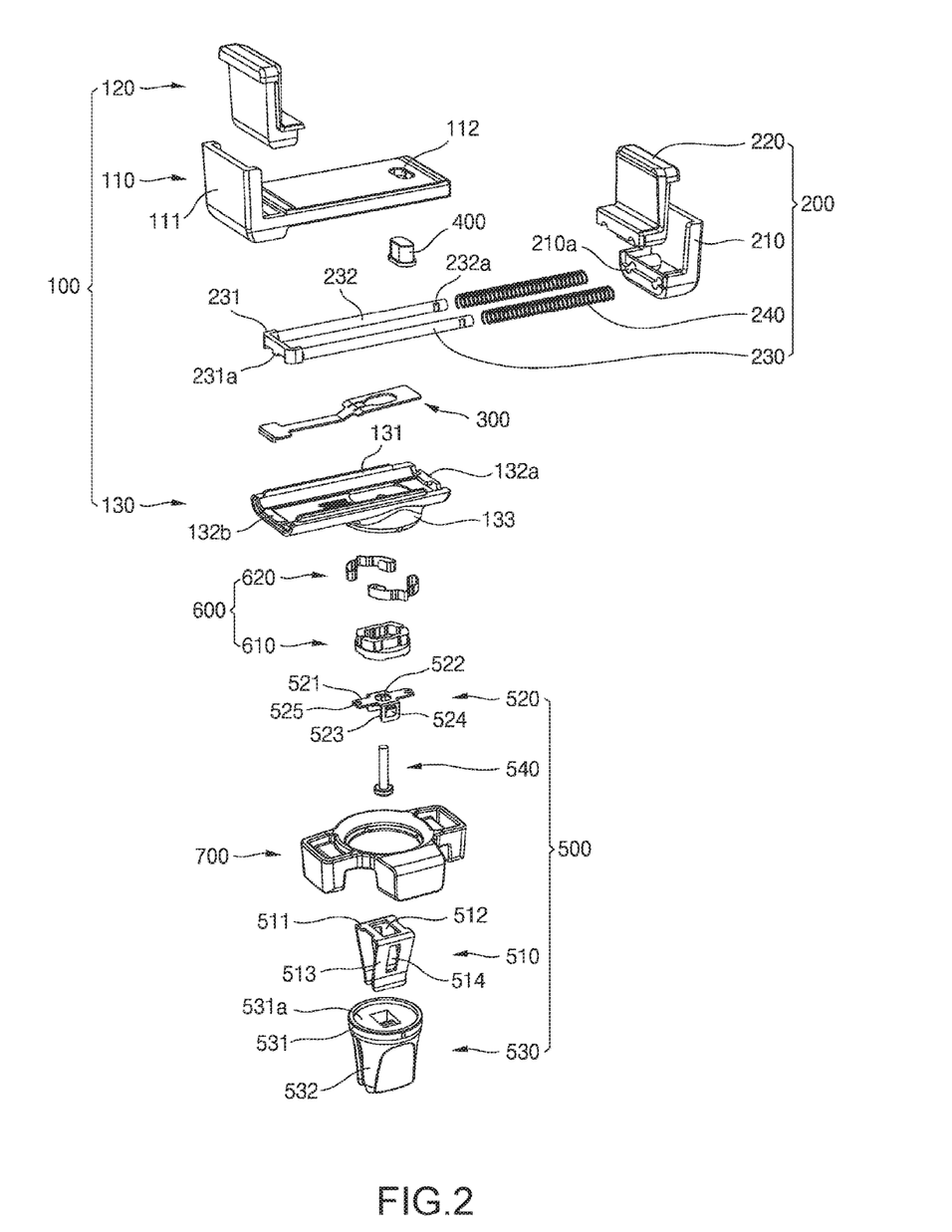
FIG. 2 is an exploded perspective view of the portable device holding apparatus of FIG. 1.

FIG. 2 is an exploded perspective view of the portable device holding apparatus of FIG. 1.

Figure 3:
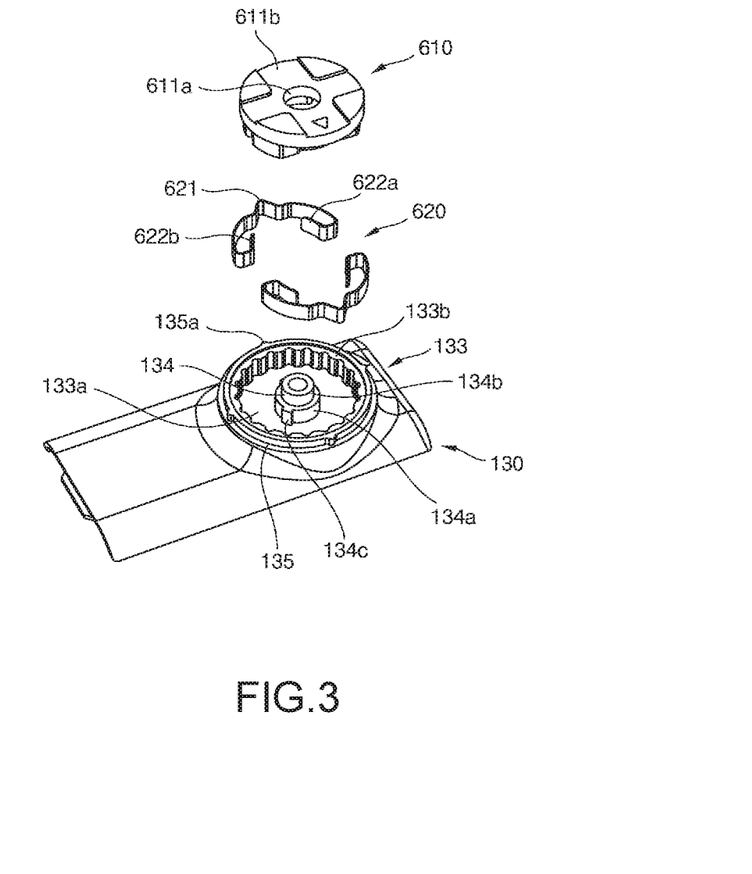
FIG. 3 is an exploded perspective view illustrating a lower cover and a rotating portion.

FIG. 3 is an exploded perspective view illustrating a lower cover and a rotating portion.

Figure 4:
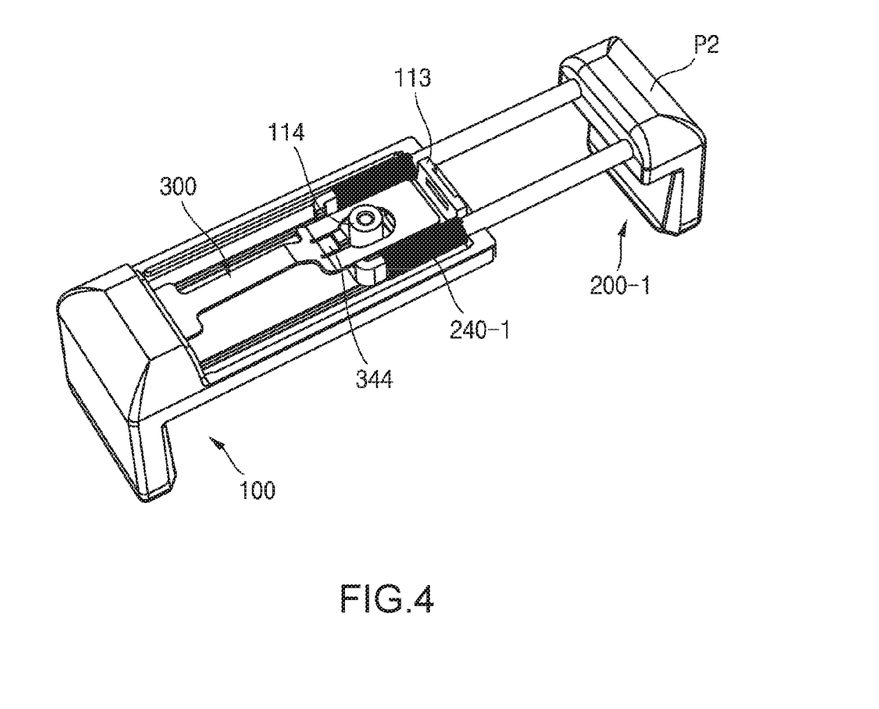
FIG. 4 is a partial exploded perspective view illustrating a state in which a mobile pad is located at a place greater than a width of a portable device.

FIG. 4 is a partial exploded perspective view illustrating a state in which a mobile pad is located at a place greater than a width of a portable device.

Figure 5:
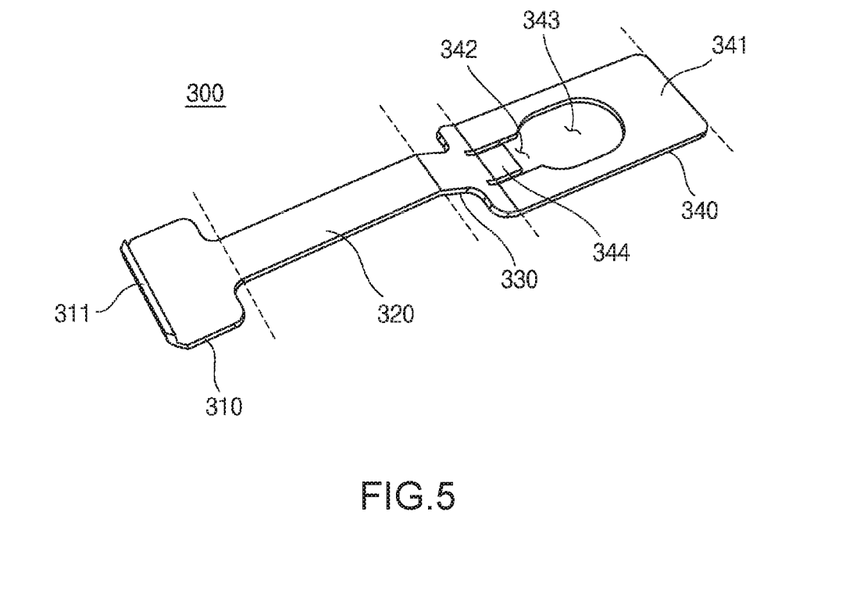
FIG. 5 is a perspective view of an elastic spring.

FIG. 5 is a perspective view of an elastic spring.

Figure 6:
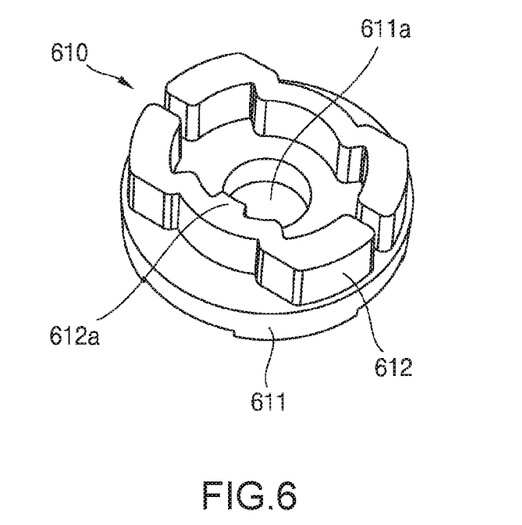
FIG. 6 is a perspective view of a rotating body.

FIG. 6 is a perspective view of a rotating body.

Figure 7:
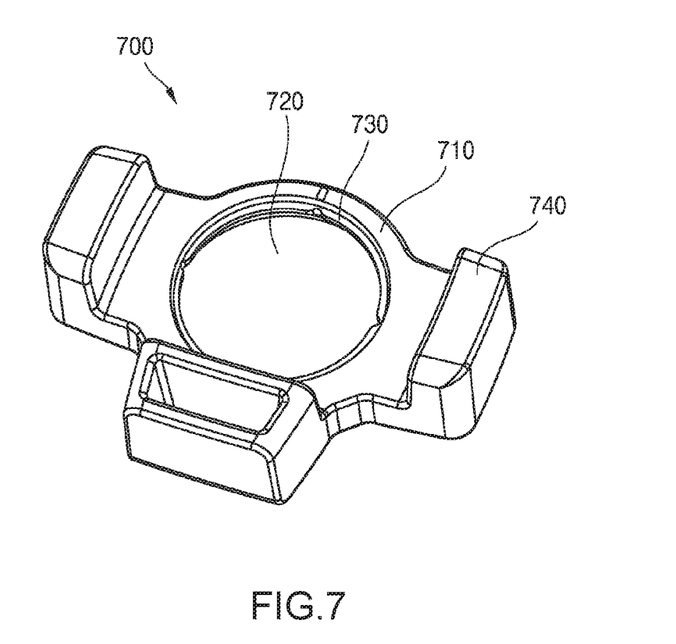
FIGS. 7 and 8 are perspective views of a supporter.
Figure 8:
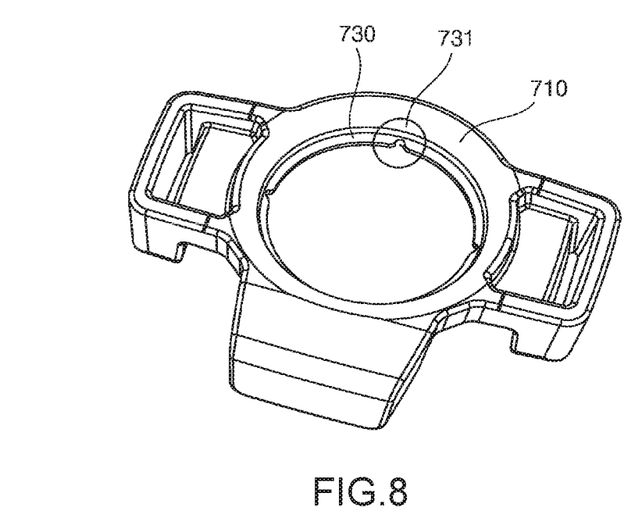

FIGS. 7 and 8 are perspective views of a supporter.

Figure 9:
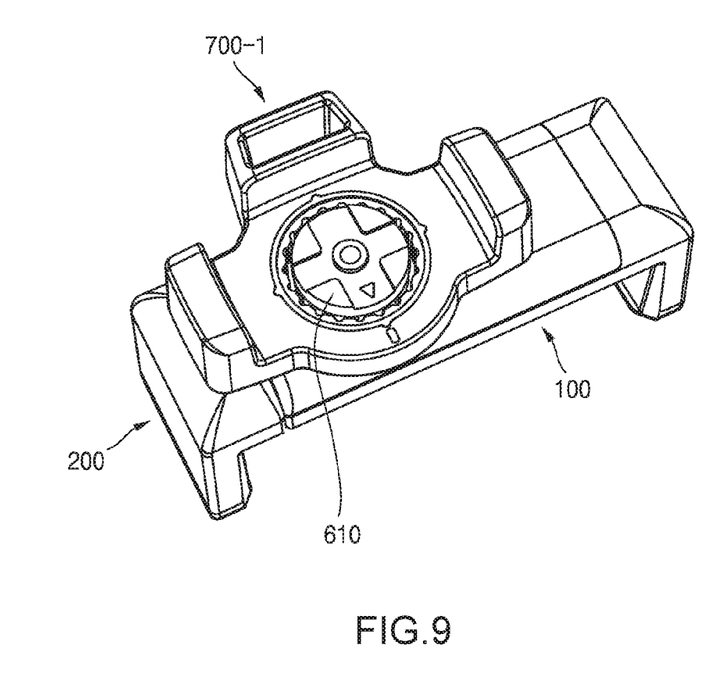
FIGS. 9 and 10 are partial perspective views illustrating a state in which the supporter coupled with a body rotates.
Figure 10:
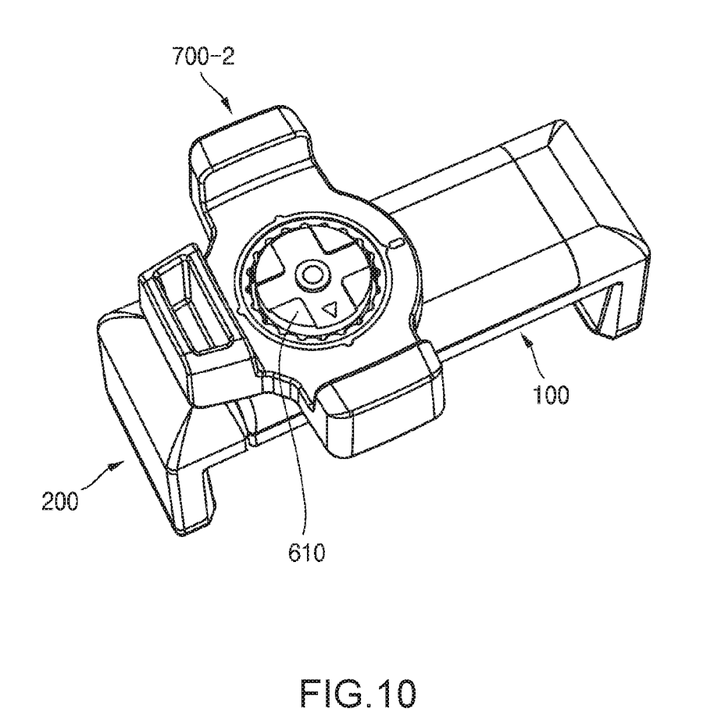

FIGS. 9 and 10 are partial perspective views illustrating a state in which the supporter coupled with a body rotates.

A portable device holding apparatus 10 according to one embodiment of the present invention is mounted in a vehicle and holds a portable device. The portable device holding apparatus 10 may be mounted on a variety of positions in the vehicle. For example, the portable device holding apparatus 10 may be mounted on a ventilation port of an air conditioner of the vehicle. The portable device is a small device capable of being carried by a passenger of the vehicle and includes a cellular phone, a smart phone, a tablet personal computer (PC), a navigation device, a global positioning system (GPS), and the like.

The portable device holding apparatus 10 includes a body portion 100, a mobile portion 200, an elastic plate 300, a button 400, a tongs portion 500, and a rotating portion 600. The portable device holding apparatus 10 may further include a supporter 700.

The portable device is disposed on the body portion 100. The mobile portion 200 is a component capable of relatively moving in one direction with respect to the body portion 100, provides a space in which the portable device is disposed, and supports the portable device. The elastic plate 300 fixes the mobile portion 200 not to move. The button 400 pushes the elastic plate 300 and releases the fixing of the mobile portion 200. The tongs portion 500 fixes the body portion 100 to a ventilation port of the vehicle. The rotating portion 600 rotatably couples the tongs portion 500 to the body portion 100. The supporter 700 supports the body portion 100 fixed to the ventilation port of the vehicle by the tongs portion 500.

The body portion 100 includes a body 110, a fixing pad 120, and a lower cover 130. The fixing pad 120 is mounted on a top surface of the body 110 and fixedly coupled with the body 110. The lower cover 130 is fixedly coupled with the body 110 at a bottom surface of the body 110.

The body 110 forms a significant area in which the portable device is disposed. The body 110 may be formed of a plastic material. The body 110 has a flat top surface and an open bottom surface. One end 111 of the body 110 is bent and protrudes upward. The body 110 includes a button hole 112. The button hole 112 may be formed in an area adjacent to the mobile portion 200. A fastening groove 113 and a nut protrusion 114 are formed at a bottom of the body 110. The fastening groove 113 is formed on each of both ends of the open bottom of the body 110. The fastening groove 113 couples and fixes the lower cover 130 to the open bottom of the body 110. A fixing bolt 540 which couples the tongs portion 500 and the rotating portion 600 to the body portion 100 is inserted into the nut protrusion 114.

The fixing pad 120 is fixed and coupled to the one end 111 of the body 110. The fixing pad 120 supports one end of the portable device disposed on the body 110. The fixing pad 120 may be formed of an elastic material. The fixing pad 120 may be formed of a rubber material. The fixing pad 120 prevents the portable device from being damaged by collision.

The lower cover 130 includes a guide groove 131, fastening protrusions 132a and 132b, and a rotation coupling portion 133. The lower cover 130 is coupled to the body 110 and covers the open bottom surface of the body 110.

The guide groove 131 is formed at a top surface of the lower cover 130. The guide groove 131 is formed lengthwise in one direction in parallel to a movement direction of the mobile portion 200. A pair of such guide grooves 131 may be formed in parallel. A spring 240 is disposed in the guide groove 131.

The fastening protrusions 132a and 132b are formed at both ends of the lower cover 130 in one direction. The fastening protrusions 132a and 132b are inserted into the fastening groove 113 of the body 110 and fix coupling between the body 110 and the lower cover 130.

The rotation coupling portion 133 includes a rotation insertion portion 133a, an uneven portion 133b, a rotation shaft 134, and a rotation mounting portion 135. The rotation coupling portion 133 is formed to protrude in a circular shape from a bottom surface of the lower cover 130. The tongs portion 500, the rotating portion 600, and the supporter 700 are coupled to the rotation coupling portion 133 by the fixing bolt 540.

The rotation insertion portion 133a is formed at the rotation coupling portion 133 to be depressed toward a top of the lower cover 130. The rotation insertion portion 133a may have a circular shape with a circumference smaller than that of the rotation coupling portion 133. The rotating portion 600 is inserted into and coupled to the rotation insertion portion 133a.

The uneven portion 133b includes consecutive bumps formed on an inner circumferential surface of the rotation insertion portion 133a.

The rotation shaft 134 includes a first shaft 134a and a second shaft 134b. The rotation shaft 134 is formed in a cylindrical shape which protrudes from a center of the rotation insertion portion 133a toward a bottom of the lower cover 130. The rotation shaft 134 is coupled to the rotating portion 600 and operates as a rotational center shaft of the rotating portion 600. A central part of the rotation shaft 134 is penetrated and provides a path through which the fixing bolt 540 passes and is inserted into and fixed to the nut protrusion 114 of the body 110.

A bottom end of the first shaft 134a is fixed to a bottom surface of the rotation insertion portion 133a. A first holding portion 134c is formed on an outer circumferential surface of the first shaft 134a. The second shaft 134b is formed above the first shaft 134a. The second shaft 134b has a circumference smaller than that of the first shaft 134a. A rotating body 610 is mounted on a top surface of the first shaft 134a, and the second shaft 134b is inserted into a through hole of the rotating body 610.

The rotation mounting portion 135 includes a protrusion 135a. The rotation mounting portion 135 is formed to be a step on an outer circumference of the rotation coupling portion 133. The supporter 700 is mounted on the rotation mounting portion 135. The rotation mounting portion 135 guides rotation of the supporter 700. The protrusion 135a is formed on an outer circumferential surface of the rotation mounting portion 135. A plurality of such protrusions 135a may be formed at certain intervals. For example, the four protrusions 135a may be formed at 90-degree intervals.

The mobile portion 200 includes a mobile base 210, a mobile pad 220, a mobile shaft 230, and the spring 240. The mobile pad 220 is mounted on and coupled to a top of the mobile base 210. One end of the mobile shaft 230 is fixed to the mobile base 210 and the mobile pad 220. The spring 240 fits on and is coupled to the mobile shaft 230.

The mobile base 210 includes a shaft hole 210a. The mobile base 210 is located on the other side of the body 110 far from the fixing pad 120. One end of the mobile base 210 protrudes upward. The one end of the mobile base 210 and the one end 111 of the body 110 face each other. The shaft hole 210a is formed at a side surface of the mobile base 210, which faces the body 110. Two of such shaft holes 210a are formed to be spaced apart from each other at a lateral length of the mobile shaft 230. The mobile shaft 230 is inserted into the shaft hole 210a.

The mobile pad 220 is mounted on and coupled to the mobile base 210. The mobile pad 220 is combined with the fixing pad 120 to support the portable device. The mobile pad 220 may be formed of the same material as that of the fixing pad 120. The mobile pad 220 prevents the portable device from being damaged by collision. The mobile pad 220 is fixed and coupled to the mobile base 210 not to allow the mobile shaft 230 inserted in the mobile base 210 to be taken out.

The mobile shaft 230 includes a fixing portion 231 and a bar portion 232. The mobile shaft 230 is a rectangular frame with open one side and has a U-channel shape. The mobile shaft 230 is formed of a metal material. The fixing portion 231 is formed to be a short bar having a flat surface. The fixing portion 231 includes a holding protrusion 231a. The holding protrusion 231a is formed to protrude downward from a center of a bottom of the fixing portion 231. Alternatively, the holding protrusion 231a may be formed by depressing a part of the bottom of the fixing portion 231. The fixing portion 231 is disposed at the lower cover 130 to be vertical to a longitudinal direction of the guide groove 131. The holding protrusion 231a may be held by a fixing-holding portion 342 of the elastic plate 300 to fix the mobile pad 220 not to move. During a process in which the holding protrusion 231a is held by the fixing-holding portion 342, the holding protrusion 231a may bounce off a vibrating plate 344 of the elastic plate 300 and generate a sound.

The bar portion 232 includes coupling grooves 232a. The bar portion 232 extends from both ends of the fixing portion 231 to one side while meeting the fixing portion 231 at the right angle. The bar portion 232 is formed to be a pair of bars which have a long round bar shape and are disposed in parallel. The coupling groove 232a is formed to be depressed in one end of the bar portion 232. The coupling grooves 232a are formed at positions in the pair of bar portions 232, corresponding to each other. When the bar portion 232 is inserted into the shaft hole 210a and the mobile pad 220 is fixed and coupled to the mobile base 210, the mobile pad 220 is coupled to the coupling groove 232a such that the mobile shaft 230 is fixed to the mobile base 210.

The spring 240 is a coil spring and has a length like that of the bar portion 232. A pair of such springs 240 are provided, and the bar portion 232 of the mobile shaft 230 is inserted into each of the pair of springs 240. The spring 240 is mounted on the guide groove 131. One end of the spring 240 is supported by the guide groove 131. The other end of the spring 240 may be pressurized and elastically compressed by the mobile shaft 230 which linearly moves from a first position P1 to a second position P2.

The elastic plate 300 includes a holding plate 310, a supporting plate 320, an inclined plate 330, and a pushed plate 340. The elastic plate 300 is disposed between the body 110 and the lower cover 130 in the body portion 100. The elastic plate 300 is formed to be an elastic thin plate. The elastic plate 300 may be formed of a plastic or metallic material.

One end of the holding plate 310 is bent toward a top of the holding plate 310 to form a contact protrusion 311. The holding plate 310 is inserted into the fastening groove 113 of the body 110. The holding plate 310 is mounted on the fastening protrusion 132b with a top surface inserted in the fastening groove 113. The contact protrusion 311 is pushed toward an inside of the fastening groove 113 by the fastening protrusion 132b inserted in the fastening groove 113 and comes into close contact with an inner wall of the fastening groove 113.

The supporting plate 320 extends from the other end of the holding plate 310, which faces the one end, by a certain length. When the elastic plate 300 is pressurized by the button 400 toward the bottom of the body 110, the supporting plate 320 is supported by the lower cover 130 and restricts a downward movement of the elastic plate 300.

The inclined plate 330 extends from the other side of the supporting plate 320 to be inclined downward.

The pushed plate 340 includes a pushed portion 341, the fixing-holding portion 342, an insertion hole 343, and the vibrating plate 344. The pushed plate 340 extends from the other side of the inclined plate 330 in the same direction as a longitudinal direction of the supporting plate 320. The pushed portion 341 is an area in contact with a bottom end of the button 400 and is pushed downward together with the button 400 being pushed. The fixing-holding portion 342 is a hole having a certain width, and the holding protrusion 231a of the fixing portion 231 of the mobile shaft 230 is inserted thereinto. The nut protrusion 114 formed at the open bottom surface of the body 110 is inserted into the insertion hole 343. One side of the vibrating plate 344 extends from the inclined plate 330, and the other side thereof forms one side of the fixing-holding portion 342. Both sides of the vibrating plates 334 are formed by cutting insides of the pushed plate 340 and the inclined plate 330. The vibrating plate 344 is elastically pressurized by the holding protrusion 231a of the mobile shaft 230 which linearly moves from the first position P1 to the second position P2. Hereupon, the vibrating plate 344 vibrates and generates a sound. The sound of the vibrating plate 344 may vary in notes thereof according to a length of the vibrating plate 344.

The pushed plate 340 comes into contact with the open bottom surface of the body 110 and is located to be spaced at a certain interval apart from the top surface of the lower cover 130. Accordingly, in the elastic plate 300, the pushed plate 340 may pivot with respect to the supporting plate 320.

The button 400 is inserted into the button hole 112 and includes a bottom end disposed on the pushed portion 341 of the elastic plate 300 and a top end which protrudes toward a top of the body 110. The button 400 is pushed by the portable device during a process in which the portable device is disposed on a cover.

The tongs portion 500 includes a tongs clip 510, a coupling clip 520, and a tongs holder 530. The tongs portion 500 is coupled with the body 110 by the fixing bolt 540 below the lower cover 130. The coupling clip 520 is coupled to the lower cover 130 by the fixing bolt 540 and fixes the tongs clip 510 and the tongs holder 530 to the lower cover 130. The tongs clip 510 is coupled with the coupling clip 520 and insert-injected with the tongs holder 530.

The tongs clip 510 includes a tongs body 511, a tongs body hole 512, tongs legs 513, and tongs leg holes 514. The tongs body 511 has a plate shape and is formed of a metal material. The tongs body 511 is coupled with the coupling clip 520 such that the tongs clip 510 is coupled with the coupling clip 520. The tongs body hole 512 is formed in a center of the tongs body 511. The tongs body hole 512 provides a path through which the coupling clip 520 is coupled. The tongs legs 513 are formed on both sides of the tongs body 511 to extend downward. The tongs legs 513 is formed at a certain height to have coupling strength necessary for preventing the tongs clip 510 from being separated from the tongs holder 530. Preferably, two tongs legs 513 may be provided and formed to be symmetrical to each other. The tongs leg hole 514 is formed to pass through one surface of the tongs leg 513 to the other surface in a center of the tongs leg 513. The tongs leg holes 514 provide a path through which a resin material of the tongs holder 530 flows in during an injection-molding process of the tongs holder 530. The tongs leg holes 514 prevent the tongs holder 530 from being out of the tongs clip 510.

The coupling clip 520 includes a coupling body 521, a coupling body hole 522, coupling legs 523, and coupling plates 524. Also, the coupling clip 520 may include elastic coupling protrusions 525. The coupling clip 520 is coupled such that the coupling legs 523 are inserted into the tongs body hole 512 of the tongs clip 510 and the coupling plates 524 are inserted into the tongs leg holes 514. Since the coupling legs 523 are elastically coupled to the coupling body 521, the coupling legs 523 are deformed inward when inserted into the tongs body hole 512 and are deformed outward when insertion is completed. As the tongs legs 513 are deformed outward, upper sides of the coupling plates 524 come into contact with a bottom surface of the tongs body 511 such that the coupling clip 520 is fixed to the tongs clip 510. Also, the coupling clip 520 is coupled to the tongs clip 510 to allow a bottom surface of the coupling body 521 to come into contact with a top surface of the tongs body 511. Since the coupling plates 524 are coupled to the tongs body hole 512, the coupling clip 520 is not separated from the tongs clip 510.

The coupling body 521 has a plate shape and is formed of a metal material. The coupling body 521 is coupled to the rotating body 610 by the fixing bolt 540. When the coupling clip 520 is coupled with the tongs clip 510, the coupling body 521 is mounted on the top surface of the tongs body 511. When the coupling clip 520 is coupled to the rotating body 610, the coupling body 521 is mounted on a fitted portion 611b of a rotating plate 611.

The coupling body hole 522 is formed in a center of the coupling body 521. The coupling body hole 522 is located on the same central axis as that of the tongs body hole 512. The coupling body hole 522 provides a path through which the fixing bolt 540 which couples the tongs portion 500 to the body portion 100 passes through and is coupled. The coupling body hole 522 is formed to have a diameter smaller than that of a head of the fixing bolt 540. The fixing bolt 540 is inserted into and coupled to the coupling body hole 522 to allow the head thereof to be mounted on the bottom surface of the coupling body 521. The fixing bolt 540 couples the coupling clip 520 to the lower cover 130.

The coupling legs 523 are formed on both sides of the coupling body 521 to extend downward. The coupling legs 523 are formed to have a certain height to allow bottom ends thereof to be located at positions lower than lower sides of the tongs leg holes 514 when the coupling clip 520 is coupled to the tongs clip 510. The coupling legs 523 are formed to have greater widths than those of the tongs leg holes 514. The coupling legs 523 are inserted into the tongs body hole 512. The coupling legs 523 are coupled to allow outer surfaces thereof to come into contact with inner surfaces of the tongs legs 513.

The coupling plates 524 are formed in a quadrangular plate shape, and lower sides thereof are coupled to the coupling legs 523. That is, the coupling plate 524 is formed by cutting both sides and an upper side of the coupling leg 523 except a lower side and bending outward from the coupling leg 523 with the lower side as a center. The coupling plate 524 is formed to allow an outside of the coupling leg 523 to further protrude as getting from the lower side toward an upper side. The upper side of the coupling plate 524 comes into contact with a bottom surface of the tongs body 511 to allow the coupling clip 520 to be coupled to the tongs clip 510.

The elastic coupling protrusions 525 are formed by allowing the both sides of the coupling body 521 to protrude. The elastic coupling protrusions 525 allow the coupling body 521 to be coupled to the rotating body 610 by the fixing bolt 540 and not to allow the fixing bolt 540 to be unfastened again.

The tongs holder 530 is configured to include a holder body 531 and holder legs 532. The holder body 531 and the holder legs 532 are formed of an elastic rubber material. The tongs holder 530 is formed by insert-molding while the tongs clip 510 is coupled to the coupling clip 520, to surround the tongs legs 513 of the tongs clip 510 and the coupling legs 523 of the coupling clip 520.

The holder body 531 has a block shape with circular surfaces and an area greater than an area of the tongs body 511. The holder body 531 includes a holder body groove 531a formed on a top surface thereof, into which a part of the rotating portion 600 is inserted when the tongs portion 500 is coupled to the body portion 100. The holder body 531 is formed to surround a side surface and a bottom surface of the tongs body 511 and tops of the tongs legs 513. Also, the holder body 531 is formed to surround a head part of the fixing bolt 540. The top surface of the tongs body 511 of the tongs clip 510 and the coupling body 521 of the coupling clip 520 are exposed at a bottom surface of the holder body groove 531a.

The holder legs 532 are formed on a bottom surface of the holder body 531 to extend downward. Two holder legs 532 are formed to be spaced apart with a center of the holder body 531 therebetween and to be symmetrical. The holder legs 532 are formed in a shape corresponding to a shape of the tongs legs 513 to surround the whole tongs legs 513. The holder legs 532 are coupled to a ventilation port of the air conditioner of the vehicle and fixes the portable device holding apparatus to the vehicle.

The rotating portion 600 includes the rotating body 610 and a plate spring 620. The rotating body 610 is coupled with the plate spring 620 such that the rotating portion 600 is fixed to a bottom of the body portion 100 by the fixing bolt 540. The rotating portion 600 fixes the tongs portion 500 to a bottom of the rotating body 610 by using the fixing bolt 540.

The rotating body 610 is inserted into and coupled to the rotation coupling portion 133 of the lower cover 130. The plate spring 620 is coupled with the rotating body 610 and inserted into and coupled to the rotation coupling portion 133 together with the rotating body 610. The rotating body 610 and the plate spring 620 are fixed to the rotation coupling portion 133 by the fixing bolt 540. The coupling clip 520 is fixed and coupled to the rotating body 610 by the fixing bolt 540.

The rotating body 610 includes the rotating plate 611 and a plate spring support 612. The rotating plate 611 is formed of a circular plate and has a size and a thickness to be insertable into the rotation insertion portion 133a. The fitted portion 611b inserted in a +shape is formed at a bottom surface of the rotating plate 611. The fitted portion 611b is matched with a top surface of the coupling clip 520. The coupling body 521 of the coupling clip 520 is coupled to the fitted portion 611b and fixed by the fixing bolt 540. Accordingly, the rotating body 610 is integrated with the coupling clip 520 to be rotatable without sliding when the coupling clip 520 rotates. A through hole is formed to vertically pass through a center of the rotating plate 611. The first shaft 134a of the rotation shaft 134 is inserted in the through hole, and the through hole provides a path through which the fixing bolt 540 passes and is fixed to the rotation shaft 134.

The plate spring support 612 is formed to protrude from a top surface of the rotating body 610. Two plate spring supports 612 may be formed in a symmetrical structure to face each other. The plate spring support 612 has both ends formed in the same shape of both ends of the plate spring 620 such that the plate spring 620 may be inserted into and fixed to the plate spring support 612. When the plate spring 620 is inserted into the plate spring support 612, a center of the plate spring support 612 is spaced apart from the plate spring 620 to form a certain space in which the plate spring 620 is compress-deformable. A second holding portion 612a is formed on an inside of any one of the two plate spring supports 612. When the rotating body 610 is coupled to the rotation insertion portion 133a and rotates, the second holding portion 612a may come into contact with the first holding portion 134c and restrict the rotation of the rotating body 610.

The plate spring 620 includes a protrusion 621 and fitting portions 622a and 622b. The plate spring 620 is coupled to the rotating body 610 coupled to the body portion 100 and prevents the tongs portion 500 coupled to the rotating body 610 from arbitrarily rotating with respect to the body portion 100.

The protrusion 621 is formed to protrude from a center of a curved surface of the plate spring 620. The protrusion 621 is formed in the same shape as that of a concave part of the uneven portion 133b.

The fitting portions 622a and 622b are formed by bending both ends of the plate spring 620 toward an inside of a round-curved surface. The plate spring support 612 of the rotating body 610 is inserted into fitting portions 622a and 622b such that the plate spring 620 is coupled with the rotating body 610.

Two plate springs 620 may be used. The plate spring 620 is disposed to put the protrusion 621 on the concave part of the uneven portion 133b when a rotational force of a certain level or more is not transferred through the tongs portion 500 and the rotating body 610. When a rotational force of a certain level or more is transferred through the tongs portion 500 and the rotating body 610 such that the plate spring 620 rotates, the protrusion 621 is pressurized and elastically compressed by a convex part of the uneven portion 133b. Afterward, when the protrusion 621 is positioned on the concave part of the uneven portion 133b again and a pressure is removed, the plate spring 620 is restored to an original shape by an elastic restoration force.

The supporter 700 includes a supporting body 710, a rotation hole 720, a rotating protrusion 730, and a contact support 740. The supporter 700 is mounted on the rotation mounting portion 135 of the lower cover 130. As the tongs portion 500 is coupled to the body portion 100 by the fixing bolt 540, the supporter 700 is coupled to the body portion 100 by the tongs portion 500. The supporter 700 is rotatably coupled to the body portion 100. The supporter 700 is rotatable independently from the tongs portion 500 with respect to the body portion 100.

The supporting body 710 is formed of a circular frame having a certain thickness. The supporting body 710 is formed of an elastic material. The supporting body 710 is formed of a rubber material. The rotation hole 720 is formed in a circular shape in a center of the supporting body 710.

The rotation hole 720 is formed to have a size to allow the supporting body 710 to be couplable with the rotation coupling portion 133 of the lower cover 130. The rotating protrusion 730 is formed on an inner circumferential surface of the rotation hole 720.

The rotating protrusion 730 is formed to be mountable on the rotation mounting portion 135 when the supporting body 710 is coupled with the rotation coupling portion 133. A bottom surface of the rotating protrusion 730 is mounted on the rotation mounting portion 135, and the tongs holder 530 is mounted on a top surface of the rotating protrusion 730. The rotating protrusion 730 rotates along the rotation mounting portion 135 and rotates the supporting body 710. A protrusion groove 731 is formed at the rotating protrusion 730. The protrusion groove 731 has a shape corresponding to that of the rotating protrusion 730 of the lower cover 130 and is formed at a position corresponding to the rotating protrusion 730. Accordingly, the rotating protrusion 730 is coupled to the protrusion groove 731 when the supporter 700 is coupled with the body portion 100. The protrusion groove 731 is coupled with the rotating protrusion 730 and guides the supporter 700 to a position at which rotation of the supporter 700 is stopped when the supporter 700 rotates.

The contact support 740 is formed to protrude upward from a top surface of the supporting body 710. The contact support 740 may be formed by extending outward from the supporting body 710 and bending extended ends thereof upward. At least two contact supports 740 may be formed. When three contact supports 740 are formed, two of them are formed at positions which form 180 degrees and the other one is formed at a position which forms 90 degrees with the two other contact supports 740. When the tongs portion 500 is coupled to the ventilation port of the air conditioner of the vehicle, the contact support 740 supports the ventilation port of the air conditioner not to allow the body portion 100 to be shaken.

Next, operations of the portable device holding apparatus according to one embodiment of the present invention will be described.

A user may easily mount a portable device on the portable device holding apparatus 10. The user disposes the portable device while a vehicle is stopped or driving. In this case, when the portable device holding apparatus according to one embodiment of the present invention is used, it is possible to dispose the portable device by using only one hand. Also, the user may easily change a direction of disposing the portable device by adjusting the portable device holding apparatus.

First, the user couples the tongs portion 500 to a bar installed at a ventilation port of the air conditioner of the vehicle and fixes the portable device holding apparatus. Here, the supporter 700 comes into contact with the ventilation port and supports the portable device holding apparatus coupled to the bar not to be shaken at the bar. The user may rotate the supporter 700 to dispose the contact support 740 at a position capable of coming into contact with the ventilation port.

The mobile pad 220 may linearly move between the first position P1 and the second position P2. The first position P1 is a position in which a gap between the mobile pad 220 and the fixing pad 120 corresponds to a width of the portable device in one direction. The mobile pad 220 is combined with the fixing pad 120 to hold the portable device at the first position P1. The second position P2 is a position in which the gap between the mobile pad 220 and the fixing pad 120 is greater than the width of the portable device in one direction.

The user disposes the portable device on the body portion 100 while the mobile pad 220 is located at the second position P2 by moving the mobile portion 200. Since the gap between the mobile pad 220 and the fixing pad 120 is greater than the width of the portable device at the second position P2, the user may dispose the portable device on the body portion 100 without interference between the mobile pad 220 and the fixing pad 120.

When the user holds the mobile portion 200 and moves the mobile pad 220 to the second position P2, the mobile shaft 230 moves along the mobile base 210 to the outside of the body portion 100 and a part thereof is located in the body portion 100. During this process, the spring 240 is compressed by the fixing portion 231 of the mobile shaft 230. The fixing portion 231 is movable to a position of the fixing-holding portion 342 of the elastic plate 300, and the holding protrusion 231a is held by the fixing-holding portion 342 and a movement of the mobile portion 200 is restricted. Even when the user takes his/her hand off the mobile portion 200, since the holding protrusion 231a is held by the fixing-holding portion 342, the mobile portion 200 does not return to the first position P1 and the spring 240 remains in a compressed state.

The user disposes the portable device on the body portion 100 while the mobile portion 200 is located at the second position P2. During a process of disposing the portable device on a top surface of a body, the button 400 is pushed by the portable device and pushes the pushed portion 341 of the elastic plate 300 disposed therebelow. Since the pushed portion 341 of the elastic plate 300 is pushed down, the fixing-holding portion 342 is moved downward and holding of the holding protrusion 231a is released. Due to releasing of the holding protrusion 231a, an elastic force of the spring 240 is transferred to the fixing portion 231 of the mobile shaft 230. The elastic force of the spring 240 moves the mobile shaft 230 toward the fixing pad 120. Here, the mobile base 210 and the mobile pad 220 also move therealong. The mobile pad 220 moves to the first position P1 and fixes one side of the portable device.

When the user holds and moves the mobile portion 200 in one direction by using one hand, the holding protrusion 231a is held by the fixing-holding portion 342 such that the mobile portion 200 is automatically fixed at the second position P2. Since an additional operation of the user for fixing the mobile portion 200 is not needed as described above, it is possible to manipulate by only one hand. Also, even when the user holds the mobile portion 200 using only one hand and applies a force thereto, the body portion 100 is stably fixed to the ventilation port without shaking due to a frictional force generated by contact between the supporter 700 and the ventilation port.

Also, the button 400 is pushed by the portable device by only disposing the portable device on the body 110 by the user such that the mobile portion 200 may move to the first position P1. Since a motion for moving the mobile portion 200, for example, a motion of pushing the button 400 to release by the user using the hand is not needed, the user may hold the portable device by using only one hand.

Also, since the mobile portion 200 holds the portable device during a moving process, the first position P1 at which the portable device is disposed may vary according to a size of the portable device. Accordingly, the portable device holding apparatus may hold a variety of sizes of portable devices.

The user may change a direction of disposing the portable device by rotating the body portion 100 or the tongs portion 500. The user may change a direction of the body portion 100 with respect to the tongs portion 500 by holding the body portion 100 using one hand and turning the tongs portion 500 using another hand before the portable device holding apparatus is fixed to the ventilation port of the air conditioner. Alternatively, the user may adjust a disposition direction of the body portion 100 by holding the body portion 100 using one hand after the portable device holding apparatus is fixed to the ventilation port of the air conditioner.

When the user fixes the tongs portion 500 to the ventilation port of the air conditioner and rotates the body portion 100, the plate spring 620 is elastically compressed and the rotation coupling portion 133 rotates such that a position of the uneven portion 133b to which the protrusion 621 is coupled is changed. Otherwise, when the user fixes the body portion 100 using the hand and rotates the tongs portion 500, the rotating body 610 coupled to the tongs portion 500 rotates. Hereupon, the plate spring 620 coupled to the rotating body 610 rotates and is elastically compressed by the uneven portion 133b. A shape of the plate spring 620 is restored by the elastic force such that the position of the uneven portion 133b to which the protrusion 621 is coupled is changed.

According to one embodiment of the present invention, there is provided an effect of stably fixing a portable device holding apparatus in a vehicle even when a portable device is held by the portable device holding apparatus using only one hand.

Also, there is provided an effect in which rotation of a portable device which is held is adjustable to allow a user to set a screen of the portable device at a desired angle.

It will be understood by one of ordinary skill in the art that a variety of modifications and equivalent other embodiments thereof may be made without departing from the essential technical concept of the present invention. It should be understood that equivalents thereof include not only currently publicly-known equivalents but also equivalents to be developed in the future, that is, all components invented to perform the same functions regardless of structures.

What is claimed is:

1. A portable device holding apparatus comprising:
a body portion comprising a body on which a portable device is disposed and which comprises an open bottom surface and a fixing pad which supports one side of the portable device;
a mobile portion comprising a mobile pad which is linearly movable between a first position which supports the other side of the portable device and a second position spaced at a certain distance apart from the other end of the portable device;
an elastic plate which fixes a movement of the mobile pad to the second position;
a button which is pushed by the portable device during a process in which the portable device is disposed on the body portion, and releases fixing of the movement of the mobile pad of the elastic plate;
a tongs portion coupled at a bottom of the body portion; and
a rotating portion fixedly coupled to a top of the tongs portion and rotatably coupled to the bottom of the body portion,
wherein the body portion comprises a rotation coupling portion which protrudes downward from a bottom surface and is formed in a circular shape, a rotation insertion portion which is formed to be depressed upward from the rotation coupling portion and into and to which the rotating portion is inserted and coupled, an uneven portion which includes consecutive bumps on an inner circumferential surface of the rotation insertion portion, and a lower cover which comprises a rotation shaft formed in a cylinder at a center of the rotation insertion portion, and
wherein the rotating portion comprises a rotating plate which is a circular plate and comprises a vertically penetrated through hole formed at a center thereof, a rotating body which comprises a plate spring support protruding from a top surface of the rotating plate, and a plate spring fixedly coupled to the plate spring support.

2. The portable device holding apparatus of claim 1, wherein the mobile portion comprises a mobile base coupled to the mobile pad, a mobile shaft which comprises one open end inserted into and coupled to the mobile base and the other end including a holding protrusion insertable into the elastic plate, and a spring into which the mobile shaft is inserted and which is elastically compressed by the mobile shaft linearly moving from the first position to the second position.

3. The portable device holding apparatus of claim 1, wherein the tongs portion comprises a tongs clip which comprises a tongs body in a plate shape and tongs legs extended downward from both sides of the tongs body, and a coupling clip coupled to the tongs clip and coupled to the rotating body by a fixing bolt, and
wherein the rotating plate comprises a fitted portion inserted into a bottom surface thereof and where the coupling clip is mounted on and coupled to.

4. The portable device holding apparatus of claim 1, wherein the rotation shaft comprises a first shaft with a bottom end fixed to the rotation insertion portion and a top surface on which the rotating plate is mounted, a second shaft formed above the first shaft to have a smaller circumference than that of the first shaft and to be inserted into the through hole of the rotating plate, and a first holding portion formed on an outer circumferential surface of the first shaft, and
wherein the plate spring support comprises a second holding portion which comes into contact with the first holding portion due to rotation of the rotating body coupled to the rotation insertion portion, and is formed on an inner circumferential surface of the plate spring support.

5. The portable device holding apparatus of claim 1, wherein the plate spring comprises a protrusion which protrudes outward from a center of a curved surface thereof and is held by the uneven portion to prevent the rotating plate from arbitrarily rotating and a fitting portion bent toward an inside of the curved surface and coupled to both ends of the plate spring.

6. The portable device holding apparatus of claim 1, further comprising a supporter coupled to the rotation coupling portion by the tongs portion coupled to the body portion,
wherein the rotation coupling portion further comprises a rotation mounting portion formed to be a step on an outer circumferential surface thereof and on which the supporter is mounted.

7. The portable device holding apparatus of claim 6, wherein the supporter comprises a supporting body having a certain thickness, a rotation hole formed in a circular shape at a center of the supporting body, and a rotating protrusion which protrudes from an inner circumferential surface of the rotation hole and is mounted on the rotation mounting portion.

8. The portable device holding apparatus of claim 7, wherein the supporter comprises a plurality of contact supports formed by extending outward from the supporting body and bending extended ends toward a top of the supporting body.

* * * * *